May 24, 1960 S. PALMESE 2,937,889
LATERAL INSERTION WASTE PIPE CONNECTOR HAVING AN OVAL HUB
Filed Dec. 10, 1957 2 Sheets-Sheet 2
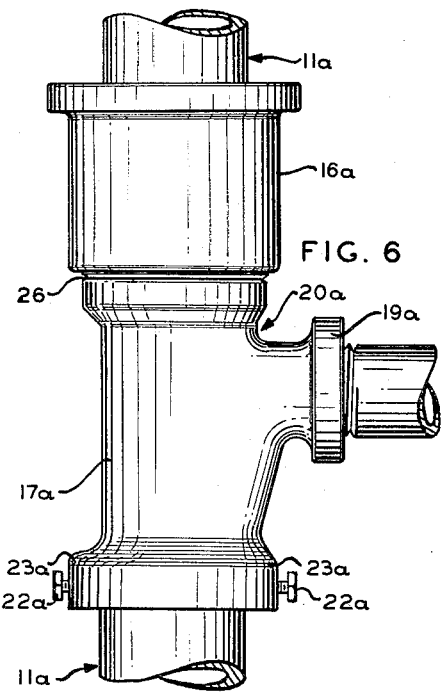
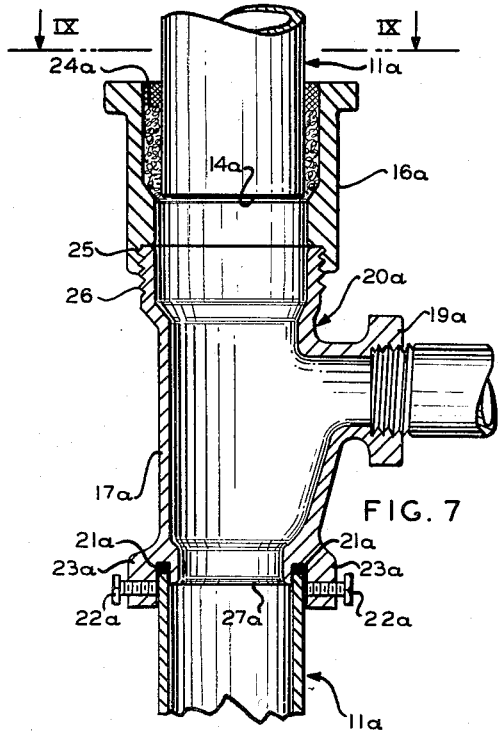
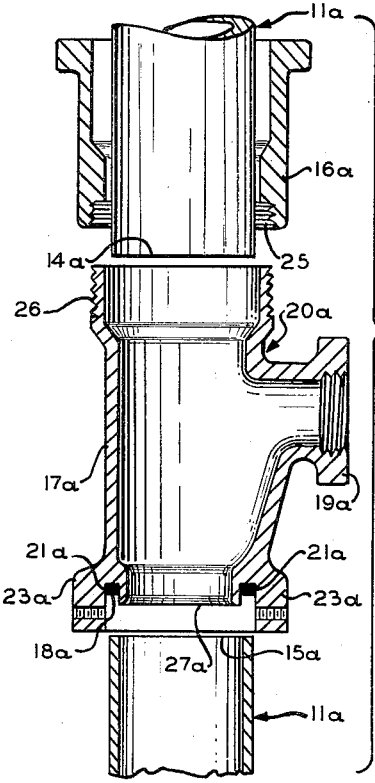
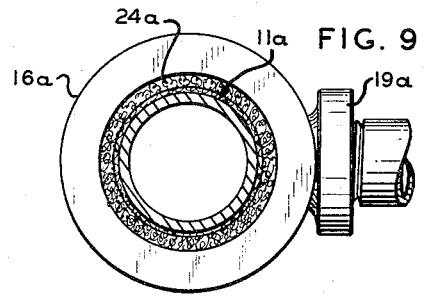
INVENTOR.
SAMUEL PALMESE
BY
Towson Price
ATTORNEY

United States Patent Office 2,937,889
Patented May 24, 1960

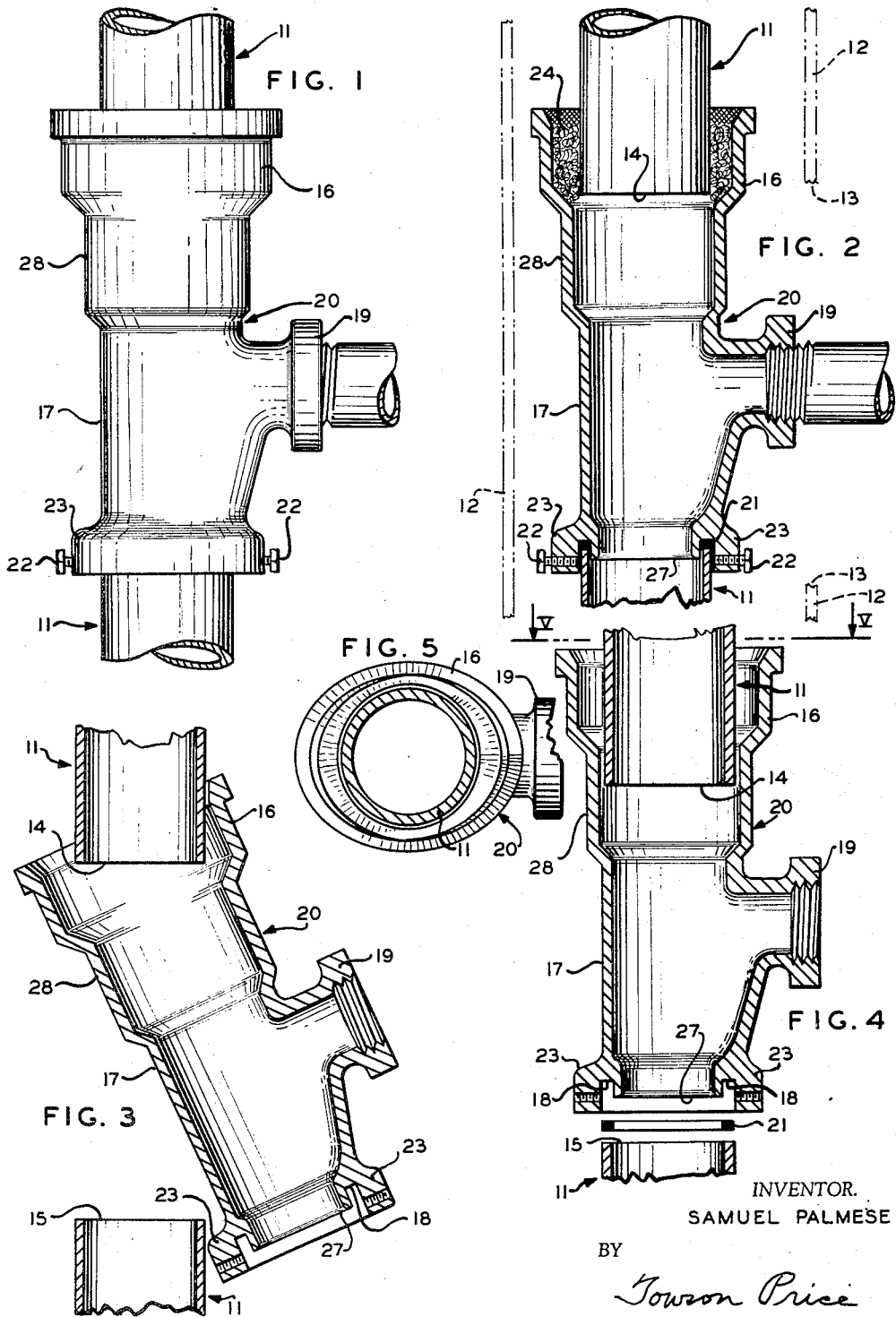

2,937,889

LATERAL INSERTION WASTE PIPE CONNECTOR HAVING AN OVAL HUB

Samuel Palmese, 33 Warman St., Montclair, N.J.

Filed Dec. 10, 1957, Ser. No. 701,775

1 Claim. (Cl. 285—31)

This invention relates to plumbing and, more particularly, to a fitting or fixture suitable for convenient insertion in soil pipes or waste lines already in place in a building.

To make a connection for new fixtures such as wash basins, sinks and the like, to an existing waste line or soil pipe line which is in a wall or building, it previously was impossible, because of necessary pipe threading and turning of the necessary new fittings, without removing the line for a considerable distance, as from floor to ceiling, to insert such fitting or fittings for new fixtures. In other words, if the connection was to be in a wall, the wall for its entire height had to be channelled, resulting in considerable expense to the property owner.

An object of the present invention is the provision of a novel and efficient one- or two-piece fixture or fitting that can be installed in a building wall or partition without requiring more space than an ordinary fitting or one of standard size, and without necessitating channelling the wall or other structural confining element for more than a very short distance.

Another object of my invention is the provision of a novel fitting which when positioned in a wall or partition will not necessitate a bulging or showing from the outside of the finished wall.

A further object of my invention is the provision of a novel and efficient cut-in fitting that is adaptable for installing in old plumbing drainage lines, because the plumber can cut-in and install it quickly and economically, even in the most difficult places.

A still further object of my invention is to obviate the necessity of a great amount of labor and expense in making additions to existing soil pipes or waste lines, particularly when such are in a wall, and to provide a cast metal hub pipe connection particularly adapted for inserting in any desired position in a line of soil pipe already installed and extending at any angle, by first cutting out a corresponding portion of the existing soil pipe, introducing the connection, and caulking the joints.

An additional object of my invention is to connect the adjacent ends of aligned pipes by an improved method which involves an economy in the use of labor and materials.

These and other objects and advantages will become apparent from the following detailed description when taken with the accompanying drawings. It will be understood that the drawings are for the purposes of illustration and do not define the scope or limits of the invention, reference being had for the latter purpose to the appended claim.

In the drawings, wherein like reference characters denote like parts in the several views:

Figure 1 is an elevational view of a waste pipe line, in which a waste pipe connection embodying my invention has been inserted.

Figure 2 is a view corresponding to Figure 1, but with parts in axial section, and the wall, or confining parts of a building in which the line is contained, indicated diagrammatically.

Figure 3 is a sectional view, corresponding to Figure 2 but showing the waste connection positioned at an angle during the step of the inserting it in place.

Figure 4 is a sectional view, coresponding to Figure 3 but showing the waste connection in a subsequent position prior to being moved to the final position illustrated in Figure 2.

Figure 5 is a transverse sectional view on the line V—V of Figure 4, in the direction of the arrows, showing the flared or normally upper portion of the fitting in end elevation.

Figures 6, 7, 8, and 9 are views corresponding, respectively, to Figures 1, 2, 4, and 5, but showing a modification.

Referring to the drawings in detail, and first considering the embodiment of my invention illustrated in the Figures 1 to 5, inclusive, there is shown a soil pipe or waste line 11, to which it is desired to connect a plumbing fixture. All that is here necessary is to remove or channel a portion of the wall or other structural confining element 12 to provide an opening 13 and then break the line 11, as by sawing out a section, leaving straight ends 14 and 15 which do not have to be threaded, spaced an appropriate distance to receive therebetween a fitting 20 embodying my invention.

The fitting 20, of the present embodiment, comprises one end portion, such as a normally upper flared, bell or hub portion 16, terminating in a plane normal to the axis of the fitting, which connects with the body portion 17 of the fitting by a portion 28 of intermediate diameter. The other or normally lower end portion of the fitting 20 is formed with an annular axially, longitudinally or downwardly opening groove 18, of the proper size to telescope over the upper or adjacent end 15 of the lower or corresponding section of the waste pipe 11. The fitting 20 is here illustrated as one of the T type to provide a branch connection 19. However, I do not wish to be limited to this, as I contemplate not only a branch extending at right angles to the body 17 of the fitting, but also Y fittings for use, for example, to cut-in waste lines for a change of direction to plumbing fixtures at a relatively distant location, "Ty" fittings for use, for example, to install plumbing fixtures relatively near the waste line or soil stack, as well as T fittings for cleanouts or tying vents to a main vent line.

In order to install a fitting embodying my invention, it is pushed through an aperture 13 in a wall or other enclosure 12, while disposed diagonally as viewed in Figure 3, so that the bell portion 16 receives the lower or corresponding end portion 14 of the adjacent section of the pipe 11. It is then moved axially or longitudinally of the pipe 11 until the lower end or spigot portion of the fitting clears the upper or adjacent end 15 of the lower or corresponding section of the pipe 11. Whereupon, it is straightened or axially aligned and then pushed up or to the position of Figure 4, so that a space may be provided to receive a lead or other suitable annular gasket device 21 on top of the end 15, for sealing the joint between said end 15 of the pipe and the end of the fitting 20 which carries the annular groove 18. The gasket 21 desirably has sufficient "give" or plasticity to conform to irregularities in the engaged surfaces and obviate leakage. The fitting 20 is then dropped or moved to engage the gasket 21, and receive it in its groove 18, or to the position of Figures 1 and 2, where the junction between the hub portion 16 and the portion 28 is positioned adjacent the end portion of the upper of the aligned pipes 11, or may be turned 90° either way about its vertical axis so that the branch connection 19 projects either way along the wall.

The fitting 20 may be centered on, and held in place with respect to, said pipe 11 by means of set screws 22 threaded into the outer flange 23 of the lower or grooved portion of the fitting 20 which, together with the inner flange 27, defines the groove 18. Said inner flange 27 may be shorter and thinner than the outer flange 23 in order to restrict the passage of fluid through the fitting as little as possible. The space between the bell portion 16 and the portion of the pipe 11 adjacent its end 14 is then centered in said portion 16 and suitably packed, as indicated at 24, as by means of oakum and lead.

Although the bell portion 16 may be circular in transverse section, yet as it is necessary to angle it with respect to the pipe line 11 in the plane including its branch connection 19, it may instead be oval, while still symmetrical about the axis of the portion 28, as viewed in Figure 5. That is, the diameter in the plane of the paper has to be long enough to allow for the necessary insertion clearance, upon angling to the position of Figure 3, while the diameter or dimension at right angles to said diameter may be smaller, as no angling to accomplish the result is necessary in any other plane, while greater than the portion 28 to allow for packing material all around the pipe 11.

Referring now to the embodiment of my invention illustrated in Figures 6 to 9, inclusive, there is shown a soil pipe or waste line 11a to which it is desired to connect a plumbing fixture. As in connection with the previous embodiment, I remove or channel a portion of the wall or other structural confining element, not here shown, to provide an opening and then break the line 11a, as by sawing out a section, leaving ends 14a and 15a, which do not have to be threaded, spaced to receive therebetween a fitting 20a embodying my invention.

In the present embodiment, however, even less of a length of pipe 11a need be removed, as I provided a two-piece fitting which does not have to be angled or disposed in a diagonal position during insertion. Thus, the fitting 20a is formed in two parts, that is, the normally upper flared bell of hub portion 16a is, instead of being integral with the body portion 17a, formed separate and provided with internal threads 25 fitting external threads 26 on the normally lower or body portion 17a. When assembled, the parts 16a and 17a make a fitting 20a generally comparable to the fitting 20 of the preceding embodiment, except that the bell portion 16a may be smaller, that is, just large enough to fit over the pipe 11a when aligned therewith and provide room for the reception of packing 24a.

The other or normally lower end portion 17a of the fitting 20a is formed with an annular axially, longitudinally or downwardly opening groove 18a, of the proper size to telescope over the upper or adjacent end 15a of the lower or corresponding section of the waste pipe 11a. The fitting 20a is here illustrated as one of the T type to provide a branch connection 19a. However, I do not wish to be limited to this, as I contemplate not only a branch extending at right angles to the body 17a of the fitting, but also Y fittings to use, for example, to cut-in waste lines for a change of direction to plumbing fixtures at a relatively distant location, "Ty" fittings for use, for example, to install plumbing fixtures relatively near the waste line or soil stack, as well as T fittings for cleanouts or tieing vents to a main vent line.

In order to install a fitting embodying the form of my invention now under consideration, the upper threadably connected end portion 16a, which amounts to a slip coupling, is removed from the body portion 17a and first slipped over the lower end portion 14a of the pipe 11a, as to the position represented in Figure 8. The body portion 17a is pushed through the aperture in the wall, or other enclosure, to the position illustrated in Figure 8 and then moved axially down to the position illustrated in Figure 7. The portion 16a is then moved down and turned about its axis to thread it upon the upper portion of the body 17a, moving it to the position represented in Figure 7.

As in the preceding embodiment, before the body position 17a is moved from the position of Figure 8 to that of Figure 7, a lead or other suitable annular gasket device 21a, as in the preceding embodiment is disposed between the end 15a of the pipe 11a and the bottom of the groove 18a, for sealing the joint between said fitting body 17a and the body 11a. Thus, when the fitting 20a is moved to engage the portion 15a of the pipe 11a, the gasket 21a is sandwiched between it and the end of said pipe.

In the present embodiment, the fitting may be centered on, and held in place with respect to said pipe 11a by means of set screws 22a threaded into the outer flange 23a of the lower or grooved portion of the fitting 20a which, together with the inner flange 27a defines the groove 18a. Said inner flange 27a may be shorter and thinner than the outer flange 23a in order to restrict the passage of fluid through the fitting as little as possible. The space between the bell position 16a and the portion of the pipe 11a adjacent its end 14a, is then centered in said portion 16a and suitably packed, as indicated at 24a, as by means of oakum and lead.

In the present embodiment, the slip coupling or bell position 16a is desirably circular in cross-section and axial elevation, as represented in Figure 9, because there is no necessity to angle it in any way with respect to the pipe line 11a. For this reason a size of the portion 16a may be approximately that of a conventional fitting, except of course provision is made for connecting it to the body portion 17a of the fitting 20a.

From the foregoing disclosure, it will be seen that I have provided a fitting which is conveniently insertable in an existing soil pipe or waste line, although it is not limited to such use. It may be inserted in any existing line, although it is especially suitable for use in one which extends vertically, or up and down rather than horizontal. As an example of forms to which at least some of the principles of my invention may be applied, I contemplate 2" drainage Y fittings, 2" by 1½" galvanized drainage Y fittings, 2" by 1½" galvanized drainage "Ty" fittings, 2" galvanized drainage T fittings, 2" galvanized drainage long "Ty" fittings, and as at the end of a line, 2" galvanized drainage L fittings, 2" by 1½" galvanized drainage reducing L fittings, as well as smaller size "Ty" and T fittings, slip couplings, and other plumbing devices.

Having now described my invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claim.

I claim:

A fitting for connecting the adjacent straight ends of a pair of spaced pipes aligned one above the other, said fitting having a hub portion at one end, extending from a portion of intermediate diameter adapted to telescope over one of said pipes, and formed at its other end with an axially opening annular groove, defined by an outer flange relatively thick and long to provide the necessary strength and an inner flange coaxial therewith and relatively short and thin to avoid unduly restricting the flow of liquid therethrough, allowing for the reception of packing therein, the hub portion being symmetrical about the axis of said portion of intermediate diameter, terminating in a plane normal to the axis of said fitting and being oval in end elevation and transverse section so as to have a maximum dimension in one axial plane long enough to allow for necessary rotation to an angular position with respect to said aligned pipes for insertion therebetween, while the minimum dimension in the axial plane at right angles to said first-mentioned dimension is smaller for economy in material, but greater than the portion of intermediate diameter, so that packing material may be inserted all around between said hub and telescoped pipe, whereby the hub portion and the portion of intermediate diameter may be telescoped over the adjacent end portion of the upper of said aligned pipes when in such angled position, rotated to a position axially therebetween, and then moved until the axially opening annular groove telescopically receives the adjacent end portion of the lower of said aligned pipes, with the junction between the hub portion and the portion of intermediate diameter positioned adjacent the end portion of the upper of said aligned pipes.

References Cited in the file of this patent

UNITED STATES PATENTS

| | | |
|---|---|---|
| 322,242 | Berry | July 14, 1885 |
| 481,935 | Dunham | Sept. 6, 1892 |
| 591,362 | Sisson | Oct. 5, 1897 |
| 620,352 | O'Brien | Feb. 28, 1899 |
| 655,033 | Vanderman | July 31, 1900 |
| 758,985 | Liebl | May 3, 1904 |
| 910,885 | Waitz | Jan. 26, 1909 |
| 1,492,322 | Guiles | Apr. 29, 1924 |
| 1,562,142 | Braczik | Nov. 17, 1925 |
| 2,535,186 | Anderson | Dec. 26, 1950 |
| 2,661,966 | Edelen | Dec. 8, 1953 |
| 2,823,049 | Hombach | Feb. 11, 1958 |

FOREIGN PATENTS

| | | |
|---|---|---|
| 15,356 | Great Britain | July 1, 1912 |